(12) United States Patent  (10) Patent No.: US 6,450,559 B1
Renke  (45) Date of Patent: Sep. 17, 2002

(54) DUAL POSITION ENDGATE CABLE POST ASSEMBLY

(75) Inventor: David Thomas Renke, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/767,294

(22) Filed: Jan. 22, 2001

(51) Int. Cl.⁷ .............................................. B62D 33/03
(52) U.S. Cl. ...................................................... 296/57.1
(58) Field of Search ......................... 296/57.1, 50, 61

(56) References Cited

U.S. PATENT DOCUMENTS

| | | | |
|---|---|---|---|
| 622,049 A | | 3/1899 | Kissinger |
| 4,601,485 A | * | 7/1986 | Furchak |
| 5,234,249 A | | 8/1993 | Dorrell ..................... 296/181.1 |
| 5,449,212 A | * | 9/1995 | Seifert ........................ 296/57.1 |
| 5,645,310 A | | 7/1997 | McLaughlin ............. 196/180.5 |
| 5,707,095 A | * | 1/1998 | Pribak et al. ............... 296/57.1 |
| 5,934,727 A | | 8/1999 | Storc et al. ............... 296/26.11 |
| 5,954,383 A | * | 9/1999 | Beck et al. .................... 296/50 |
| 6,068,321 A | * | 5/2000 | Ooms ......................... 296/57.1 |
| 6,126,223 A | * | 10/2000 | Rayburn ..................... 296/57.1 |
| 6,183,031 B1 | * | 2/2001 | Ballard et al. ............. 296/57.1 |
| 6,267,429 B1 | * | 7/2001 | Kuzmich et al. ............. 296/50 |
| 6,279,979 B1 | * | 8/2001 | Cauley ....................... 296/57.1 |

* cited by examiner

Primary Examiner—Joseph D. Pape

(57) ABSTRACT

A dual position endgate cable post assembly for positioning a tailgate of an automotive vehicle at any height between the fully open and closed positions, which includes a first cable attachment member supported by the body of an automotive vehicle, a second cable attachment member coupled to the tailgate of the automotive vehicle, and a third cable attachment member supported by the body of the vehicle, wherein the third cable attachment member is located below the first cable attachment member. The dual position endgate cable post assembly further includes a cable having a first end supported by the first cable attachment member and a second end supported by the second cable attachment member, wherein the cable can be wound one or more times around the third cable attachment member to adjust the length of the cable extending between the first cable attachment member and the second cable attachment member.

12 Claims, 2 Drawing Sheets

DUAL POSITION ENDGATE CABLE POST ASSEMBLY

TECHNICAL FIELD

This invention relates to a cable attachment assembly for use with an automotive vehicle having a cargo or storage compartment closed by a tailgate. More particularly, the invention relates to a cable attachment assembly and method for adjusting the height of the tailgate to an intermediate position between fully open and closed.

BACKGROUND OF THE INVENTION

Automotive vehicles having a cargo or storage compartment closed by a tailgate have been known for many years. The cargo box or storage compartment typically includes a standard length, which allows the accommodation of a load having a length equal to or less than the length of the cargo box. Devices for adjusting the tailgate height to allow the cargo space to accommodate loads having a length longer than the cargo bed have been known for many years. U.S. Pat. No. 622,049, issued to Kissinger in 1899, describes a device for adjustably supporting and locking the end gate of a wagon. The disclosed device uses a bracket having a plurality of angular teeth or hooks adapted to engage a pin or bolt supported by the bracket. U.S. Pat. No. 773,776, issued to Barber in 1904, discloses a mechanical device having a pair of guide wings that are fitted with a guideway for adjustably positioning the end gate of a wagon at a position between fully open and closed.

U.S. Pat. No. 5,645,310 (hereinafter "the '310 patent"), issued to McLaughlin, discloses an apparatus for holding a tailgate in a partially open position by using a connector of a predetermined length having first and second attachment means connected to its first and second ends, respectively. The first attachment means can be coupled to a vehicle body and the second attachment means can be coupled to the tailgate. The degree of openness of the tailgate can be determined by the length of the connector, the location of the first attachment means on the vehicle body and the location of the second attachment means on the tailgate.

The '310 patent further describes several additional embodiments of devices that can be used to vary the height of the tailgate, each requiring the use of one or more cables or connectors in conjunction with one or more attachment points located on the vehicle body and at least one attachment point located on the tailgate.

Finally, U.S. Pat. No. 5,934,727 (hereinafter "the '727 patent") owned by the assignee of the present invention, discloses a tailgate for a pick up truck that can be folded downward and held open in an intermediate position by adjustable side straps. The adjustable side straps include an intermediate link which can be attached to a mating attachment feature, such as a disk, mounted on the respective side edges of the cargo box. Adjustment of the strap can be accomplished manually, simply by detaching any other link on the strap and attaching the intermediate link to the attachment feature. The '727 patent further states that the tailgate could be held in the intermediate position by straps having numerous additional links, by cables having adjustable keyhole fittings, by chains with adjustable links that snap onto any mating feature on the cargo box or by another mating feature on the cargo box, or by any other adjustable rack and pinion or winching devices which can adjust the tailgate to numerous desired partially open positions, including the intermediate position.

SUMMARY OF THE INVENTION

The present invention is directed to a dual position endgate cable post assembly and a dual position cable post that allows positioning the tailgate of an automotive vehicle at any height between the fully open and closed positions. The dual position endgate cable post assembly includes a first cable attachment member supported by the body of an automotive vehicle, and a second cable attachment member coupled to the tailgate of the automotive vehicle. The dual position endgate cable post assembly also includes a third cable attachment member supported by the body of the vehicle, wherein the third cable attachment member is located below the first cable attachment member.

The dual position endgate cable post assembly further includes a cable having a first end that can be supported by the first cable attachment member and a second end that can be supported by the second cable attachment member, wherein the cable can be wound one or more times around the third cable attachment member to adjust the length of the cable extending between the first cable attachment member and the second cable attachment member. This arrangement allows the height of the tailgate to be varied when the second end of the cable is coupled to the second cable attachment member.

The first cable attachment member and second cable attachment are preferably lugs, each of which can include an elongated body fabricated of a metal, plastic or composite material. The lugs include a free end and one end supported by the body of the automotive vehicle.

The third cable attachment member is preferably a circular disk having a sidewall surface defining a channel therein for receiving the cable. The third cable attachment member is made of metal, wherein the metal is covered with a polymer coating.

In the disclosed embodiment, the third attachment member can be secured in position as supported by the vehicle body using a mechanical fastener such as a bolt. Additionally, the third attachment member can be reinforced using a body reinforcement panel positioned adjacent the vehicle body and the third attachment member.

The dual position endgate cable post assembly can be used in conjunction with a dual position cable post including a circular disk having an elongated body portion, the body porting including a sidewall surface defining a channel in the outer periphery thereof for receiving a cable, the circular disk being adapted for attachment to an automotive vehicle.

In an alternative embodiment, the dual position endgate cable post assembly can be installed on a vehicle body such that the first cable attachment member and the third cable attachment member are supported by an inner panel supported by the body of the automotive vehicle.

The present invention also relates to a method of adjusting a tailgate to an intermediate position between fully open and fully closed including the steps of: (1) providing a first cable attachment member supported by the body of an automotive vehicle; (2) providing a second cable attachment member for attachment to the tailgate of an automotive vehicle; (3) providing a third cable attachment member supported by the body of an automotive vehicle at a position below the first cable attachment member; and (4) extending a cable between the first cable attachment member and the second cable attachment member, wherein a portion of the cable can be wound one or more times around the third cable attachment member to vary the length of the cable that extends between the first cable attachment member and the second cable attachment member.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

The present invention is directed to an apparatus 100 and method for retaining a closure for an automotive vehicle storage compartment in the partially open position. Specifically, an automotive vehicle such as a pick up truck, sport utility vehicle or any other automotive vehicle having a cargo box or storage area can be used in conjunction with the dual position endgate cable post assembly 100.

Figure 5:
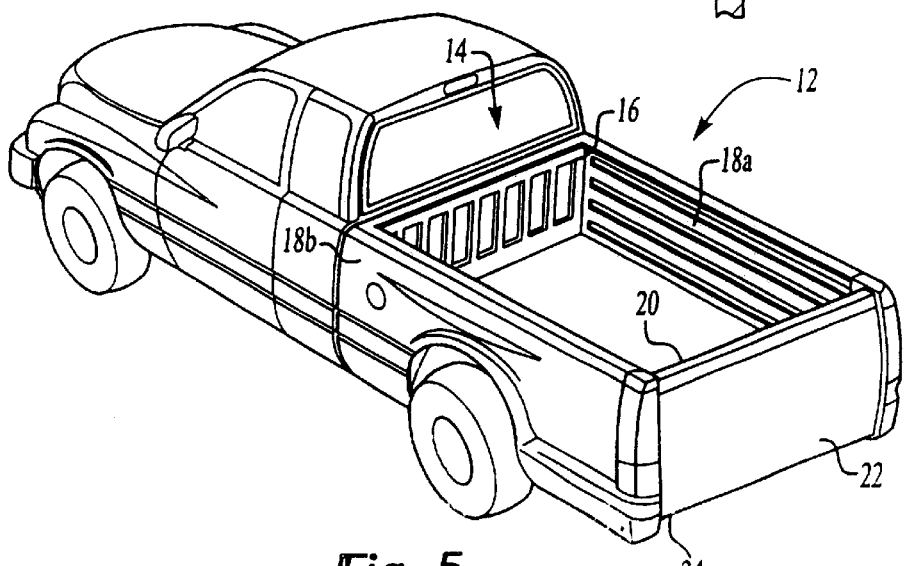
FIG. 5 is a perspective view of a cargo box for a pick up truck.

For illustration purposes only, the present invention will be described with reference to a pick up truck 12 including a cargo box 14 having an inner panel 28 welded or otherwise coupled to an outer panel (not shown). The inner panel 28 comprises four sides including a front wall 16, first and second sidewalls 18a, 18b and a rear wall 20, as illustrated in FIG. 5. The inner panel 28 can also include a beam 29 extending vertically between the sidewall surfaces 18a, 18b, and having a front surface 30 defining an opening 40 and sidewall surfaces 32 surrounding an open center (not shown).

At the rear wall 20, the tailgate 22 is pivotally mounted at a second tailgate edge 24 adjacent the sidewalls 18a, 18b for normal movement between a fully open condition and a fully closed condition. A hinge 26 is typically used to couple the tailgate 22 to the tailgate edge 24.

Turning now to a discussion of the dual position endgate cable post assembly 100, one of skill in the art will appreciate that a pair of identically constructed dual position endgate cable post assemblies 100 could be used to position the tailgate 22 in a partially open position: one positioned at the sidewall 18a and another positioned at the sidewall 18b. For purposes of illustration only, a single dual position endgate cable post will be described herein.

The dual position endgate cable post assembly 100 includes a first cable attachment 102, a second cable attachment 104, a tailgate dual position cable post 106 and a tailgate cable assembly 108. The first cable attachment 102 and the second cable attachment 104 are identical in construction and configuration. The first and second cable attachments 102, 104 can take on a variety of forms. However, in the disclosed embodiment, the first and second cable attachments 102, 104 are lugs, each including an elongated body. One of skill in the art will appreciate that the first and second cable attachments could be an eyebolt or other similar device.

The first and second cable attachments 102, 104 can be made of a metal, composite or plastic material. In the disclosed embodiment, the first and second cable attachments are made of a lightweight metal such as aluminum or steel.

The tailgate dual position cable post 106 can include a circular disk 110 having a first surface 112 coupled to a second substantially parallel surface 114 by an intermediate arcuate surface 116. The intermediate arcuate surface 116 defines a channel 118 that extends around the entire perimeter of the arcuate surface 116. The disk 110 also defines a central opening therethrough for receiving a mechanical fastener.

The disk 110 could be made of a metal, composite or plastic material. In the disclosed embodiment, the disk 110 is made of a metal coated with a polymer coating for reducing the friction between the disk and a mating part. In addition, rather than being the preferred disk shape, any shape having arcuate surface shapes to receive cable 122 will suffice.

The tailgate cable assembly 108 includes a cable or strap 122. One of skill in the art will appreciate that the cable 122 can include a variety of structures having the flexibility to be wound one or more times around a support structure. For instance, the cable 122 could include a standard rope or chain. The channel 118 of disk 110 is sized to mate with the outer surface of cable 122, the radius of channel 118 being slightly larger than the radius of cable 122.

The cable 122 supports a fitting 124 at one end thereof, and a fitting 126 at the other end. In the disclosed embodiment, each fitting 124, 126 includes a ring shaped head 128, and each ring shaped head 128 supports a leg 132 that extends outwardly therefrom. One of skill in the art will appreciate that the exact configuration and size of the fittings 124, 126 will depend on the size and configuration of the structure intended to be engaged by the fittings 124, 126. For instance, the fittings 124, 126 could include hooks, snaps or any other similar device adapted to engage the attachment members 102, 104. The support leg 132 for each fitting 124, 126 is crimped onto the respective end of the cable 122 so as to form an integral structure.

ASSEMBLY

Figure 2:
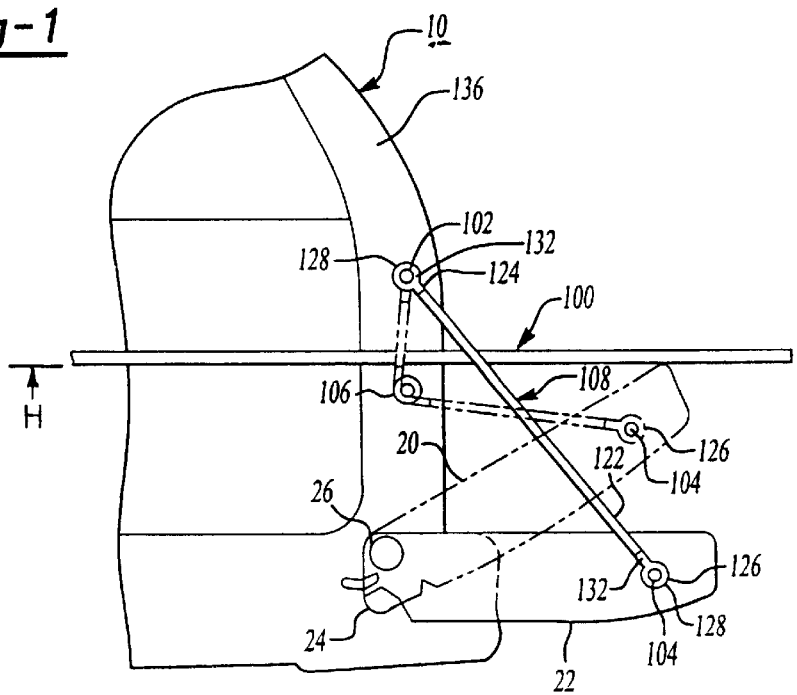
FIG. 2 is an elevation view of a cable attachment assembly attached to an automotive vehicle, wherein the cable attachment assembly utilizes the dual position endgate cable post assembly shown in FIG. 1.
Figure 3:
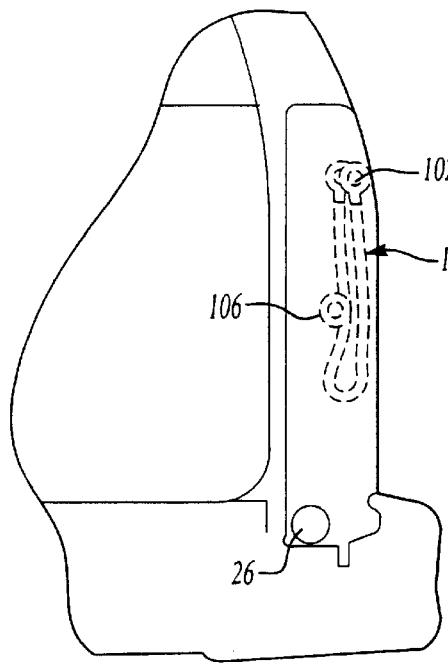
FIG. 3 is an elevation of the cable attachment assembly shown in FIG. 2 shown in the stored position.

The dual position post assembly 100 can be assembled by coupling the first cable attachment 102 to the inside portion of the cargo box 14 at the inner panel 28. As illustrated in FIG. 2, the first cable attachment 102 is coupled to the cargo box 14 at an upper end of the beam 29 defined by the sidewall surface 18a of the inner panel 28. One of skill in the art will appreciate that the first cable attachment 102 can be coupled to the inner panel 28 using mechanical fasteners such as bolts, screws or other similar devices. One of skill in the art will appreciate that the first cable attachment 102 could be attached to the inner panel 28 using other similar devices or known techniques such as welding.

The second cable attachment 104 can be coupled to the tailgate 22 at an upper end thereof as illustrated in FIG. 2. The second cable attachment 104 can be coupled to the upper end of the tailgate 22 using mechanical fasteners such as bolts, screws or other similar devices.

In the disclosed embodiment, the dual position post 106 is shown attached to the beam 29 defined by the inner panel 28 at a position below the first cable attachment 102. The dual position cable post 106 is coupled to the inner panel 28 via a mechanical fastener such as a bolt screw received in the opening 40 at a height below the height "H" of the top of the vehicle's wheelhouse. This places the upper inside edge of tailgate 22 at approximately the same height to cooperate in supporting a long load.

Figure 1:
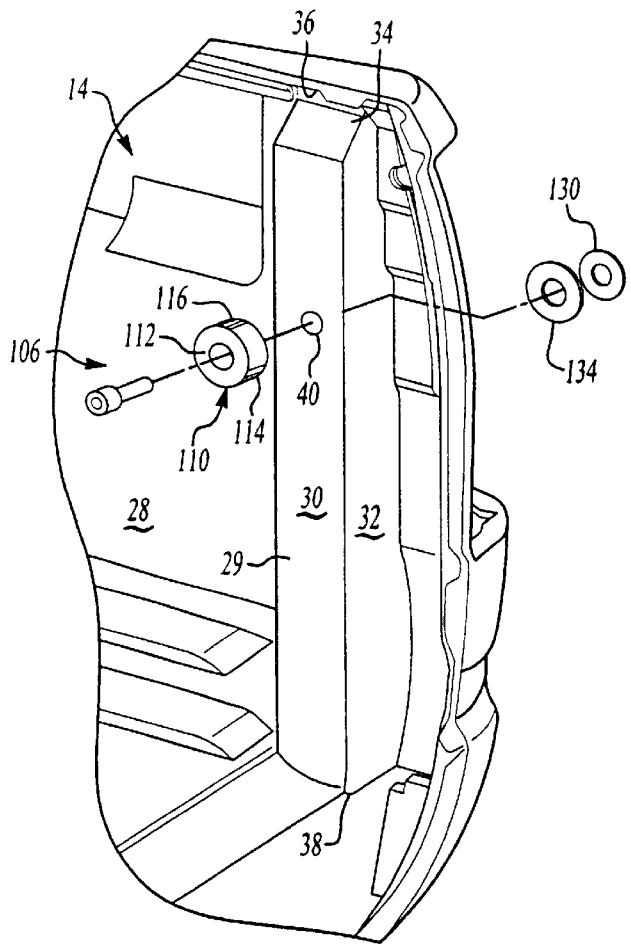
FIG. 1 is an exploded perspective view of a dual position cable post formed in accordance with the teachings of this invention.
Figure 4:
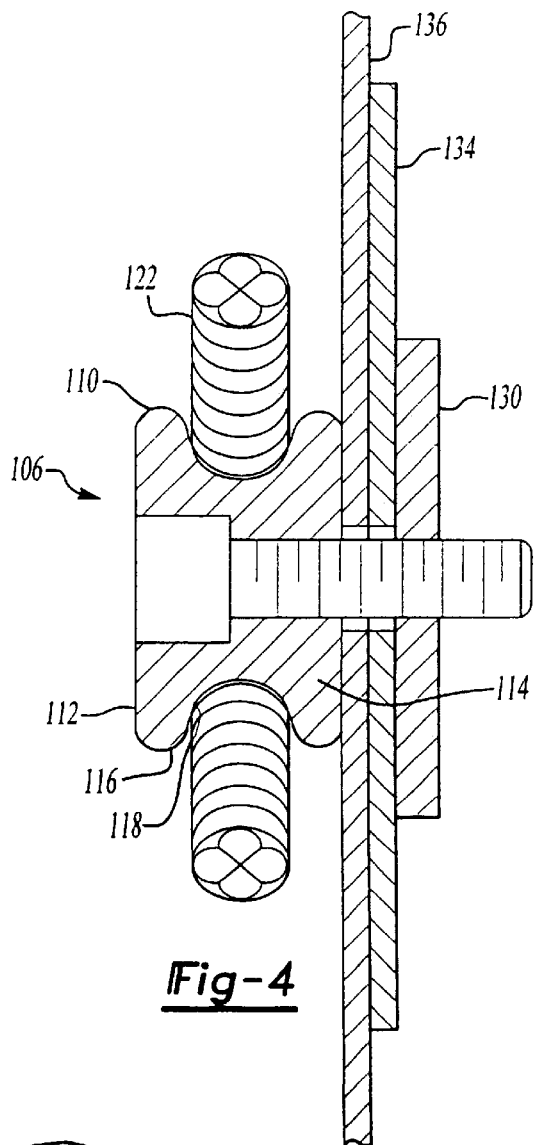
FIG. 4 is a section view of the dual position cable post shown in FIG. 1, wherein the dual position cable post is shown supporting a portion of a cable.

The mechanical fastener can be used in conjunction with a washer or gasket 130 as shown in FIG. 1. One of skill in the art will appreciate that the dual position cable post 106 could be welded to the beam 29 or coupled thereto using other known techniques. The mechanical fastener can also be used in conjunction with a reinforcement plate 134 positioned between the inner panel 28 and the disk 110. The reinforcement plate 134 can extend parallel to the front surface 30 of the beam 29 defined by the inner panel 28, and can include an opening for receiving the mechanical fastener as best seen in FIG. 4.

The dual position endgate cable post assembly 100 could be installed onto inner panel 28 of the cargo box 14 during the original manufacturing process or after manufacturing as after market adjustment, provided that proper structural integrity of the vehicle exists for the desired attachment location.

OPERATION

As shown in FIG. 2, the full length of the tailgate cable assembly 108 can extend between the first and second cable attachment 102, 104 when the tailgate 22 is in the fully open position. To position the tailgate 22 in a partially open position, the tailgate cable assembly 108 can be coupled to the first cable attachment 102 and then wound one or more times around the outer periphery of the disk 110. As best illustrated in FIGS. 2 and 4, the cable 122 is received in the channel 118 of the disk 110 and wrapped one or more times around the channel 118. The second end of the cable 122 is then attached to the second cable attachment 104.

Connecting one end of the cable assembly 108 to the first cable attachment member 102 and wrapping the tailgate cable assembly 108 around the disk 110 permits the tailgate cable assembly 108 to be adjusted to different lengths. This arrangement allows the tailgate 22 to be adjusted to different heights when the other end of the cable assembly is coupled to the second cable attachment 104. One of skill in the art will appreciate that the number of times that the tailgate cable assembly 108 is wound around the dual cable post 108 will depend on the desired height to which the tailgate 22 is to be positioned.

The present invention allows the tailgate 22 to be adjusted to different heights using a single cable 122, wherein the length of the tailgate cable assembly 108 supporting the tailgate 22 can be adjusted by wrapping the cable 122 around the dual position cable post 106 one or more times. The use of the dual position post 106 eliminates the need to have various sizes of cables readily available for use or the use of cables having adjustable links or segments. Furthermore, the present invention eliminates the need for complex winching or mechanical systems for holding the tailgate 22 in a partially open position.

Additionally, when the tailgate cable assembly 108 is not in use, the tailgate cable assembly 108 can be conveniently stored by coupling both fittings 124, 126 to the first cable attachment 102. In the disclosed embodiment, the head 128 of the fittings 124, 126 frictionally engage the first cable attachment 102, and are held securely in place by the frictional force between the two components.

In an alternative embodiment, the beam 29 defined by the inner panel 28 could be eliminated and the dual position endgate cable post assembly 100 coupled directly to the sidewall 18a of the cargo box 14. Thus, the reinforcement member 134 would be positioned between the disk 110 and the sidewall 18a of the cargo box 14.

The preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A dual position endgate cable post assembly, comprising:
   a first cable attachment member attached to a body of an automotive vehicle;
   a second cable attachment member coupled to the tailgate of the automotive vehicle;
   a third cable attachment member attached to the body of the vehicle, wherein the third cable attachment member is located below the first cable attachment member on the vehicle body; and
   a cable having a first end that can be supported by the first cable attachment member and a second end that can be supported by the second cable attachment member, wherein the cable can be wound one or more times around the third cable attachment member to adjust the length of the cable extending between the first cable attachment member and the second cable attachment member.

2. The dual position endgate cable post assembly as defined in claim 1, wherein the first cable attachment member and second cable attachment are lugs.

3. The dual position endgate cable post assembly as defined in claim 1, wherein the third cable attachment member is a circular disk having a sidewall surface defining a channel therein for receiving the cable.

4. The dual position endgate cable post assembly as defined in claim 1, wherein the third attachment member is held in position using a mechanical fastener.

5. The dual position endgate cable post assembly as defined in claim 1, wherein the third attachment member is reinforced using a body reinforcement panel positioned adjacent the vehicle body.

6. The dual position endgate cable post assembly as defined in claim 1, wherein the third cable attachment member is metal.

7. The dual position endgate cable post assembly as defined in claim 6, wherein the metal is coated with a polymer coating.

8. The dual position endgate cable post assembly as defined in claim 1, wherein the first cable attachment member and the third cable attachment member are supported by an inner panel supported by the body of the automotive vehicle.

9. A method of adjusting a tailgate to an intermediate position between fully open and fully closed, the method comprising the steps of:
   providing a first cable attachment member supported by a body of an automotive vehicle;
   providing a second cable attachment member for attachment to a tailgate of the automotive vehicle;
   providing a third cable attachment member supported by the body of the automotive vehicle at a position below the first cable attachment member;
   connecting a first end of a cable to the first cable attachment member;
   connecting a second end of the cable to the second cable attachment member; and
   adjusting an effective length of the cable between the first cable attachment member and the second cable attachment member by winding the cable one or more times around the third cable attachment member.

10. The method as defined in claim 9 wherein the third cable attachment member is a circular disk having a sidewall surface defining a channel therein for receiving the cable.

11. The method as defined in claim 9, the first cable attachment member and the second cable attachment member are lugs.

12. The method as defined in claim 9, wherein the first cable attachment member and the third cable attachment member are supported by an inner panel supported by the automotive vehicle.

* * * * *